US012770147B2

(12) United States Patent
Gu et al.

(10) Patent No.: US 12,770,147 B2
(45) Date of Patent: Oct. 20, 2026

(54) MULTI-TASK CONVOLUTIONAL NEURAL NETWORK FOR BEHAVIOR SEQUENCE EMBEDDING MODELING

(71) Applicant: eBay Inc., San Jose, CA (US)

(72) Inventors: Minghao Gu, Austin, TX (US); Bo Qu, Shanghai (CN); Zhurong Wang, Austin, TX (US); Daisuke Yagi, Houston, TX (US); Zitao Zhang, Shanghai (CN); Zhichao Han, Shanghai (CN); Yang Zhao, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/679,129

(22) Filed: May 30, 2024

(65) Prior Publication Data

US 2025/0371543 A1 Dec. 4, 2025

(51) Int. Cl.

| | |
|---|---|
| ***G06Q 20/40*** | (2012.01) |
| ***G06N 3/0464*** | (2023.01) |
| ***G06Q 50/26*** | (2012.01) |

(52) U.S. Cl.

CPC ..... *G06Q 20/40145* (2013.01); *G06N 3/0464* (2023.01); *G06Q 50/265* (2013.01)

(58) Field of Classification Search

None

See application file for complete search history.

(56) References Cited

U.S. PATENT DOCUMENTS 9,185,095 B1 * 11/2015 Moritz ................ H04L 63/0861
2009/0307028 A1 * 12/2009 Eldon ................ G06Q 20/4016 705/37

(Continued)

FOREIGN PATENT DOCUMENTS

| | | |
|---|---|---|
| CN | 110415022 A | 11/2019 |
| CN | 112053219 A | 12/2020 |
| CN | 115408449 B | 3/2023 |

OTHER PUBLICATIONS

Hilal et al., "Financial Fraud: A Review of Anomaly Detection Techniques and Advances", Expert Systems With Applications, vol. 193, 2022, 34 pages.

(Continued)

*Primary Examiner* — William J Jacob
(74) *Attorney, Agent, or Firm* — Shook Hardy & Bacon L.L.P.

(57) ABSTRACT

Some aspects of the present technology relate to performing fraud detection on online transaction platforms through user behavior sequence data. A multi-task convolutional neural network (MTCNN) model is used to predict, in real-time, whether user behavior sequence data is indicative of fraudulent activity. To perform fraud detection in such configurations, a one-layer convolutional neural network architecture with multi-range kernels is employed. The MTCNN model receives a sequence of page browsing signals corresponding to a buyer. Each page browsing signal corresponds to a position in the sequence. One or more portions of the page browsing signals are selected. Each of the one or more portions of the page browsing signals and the corresponding (Continued)

position are embedded in one or more sequence embeddings. A fraud risk for each of the one or more sequence embeddings is predicted utilizing the MTCNN model.

20 Claims, 5 Drawing Sheets

(56) References Cited

U.S. PATENT DOCUMENTS

2010/0094791 A1* 4/2010 Miltonberger ....... G06Q 10/067 706/46
2015/0026027 A1* 1/2015 Priess .................... G06Q 10/04 705/35
2016/0071105 A1* 3/2016 Groarke ............. G06Q 20/4016 705/44
2019/0012654 A1* 1/2019 Dragushan ......... G06Q 20/3433
2020/0126086 A1 4/2020 Li
2020/0184278 A1* 6/2020 Zadeh .................... G06N 3/044
2022/0351216 A1* 11/2022 Kramme ............ G06Q 30/0185
2022/0385975 A1* 12/2022 Chen .................. H04N 21/4666
2023/0177436 A1* 6/2023 Gupta ................ G06Q 10/0635 705/7.28
2023/0351215 A1 11/2023 Sun et al.
2024/0095598 A1* 3/2024 Faith .................... G06N 3/0464
2025/0124442 A1* 4/2025 Rule .................. G06Q 20/3821
2025/0165125 A1* 5/2025 Maschmeyer ........ G06F 3/0482

OTHER PUBLICATIONS

Rao et al., "xFraud: Explainable Fraud Transaction Detection", Available at : <arXiv:2011.12193v3 [cs.LG] May 25, 2022>., May 25, 2022, 27 pages.
Yang et al., "FinChain-BERT: A High-Accuracy Automatic Fraud Detection Model Based on NLP Methods for Financial Scenarios", MDPI—Information, vol. 14, 2023, 26 pages.
Yin et al., "Behavioral graph fraud detection in E-commerce", Available at : <arXiv:2210.06968v1 [cs.LG] Oct. 13, 2022>, Oct. 13, 2022, 8 pages.
Zhu et al., "Modeling Users' Behavior Sequences with Hierarchical Explainable Network for Cross-domain Fraud Detection", Available at : <arXiv:2201.01004v1 [cs.LG] Jan. 4, 2022>, Jan. 4, 2022, 11 pages.

* cited by examiner

MULTI-TASK CONVOLUTIONAL NEURAL NETWORK FOR BEHAVIOR SEQUENCE EMBEDDING MODELING

BACKGROUND

In recent years, financial frauds using online transaction platforms (e.g., e-commerce and other systems that support online transactions) have attracted widespread attention. As the number of online transactions using such platforms increases, the risk of transaction fraud has also escalated. These fraudulent activities may disrupt economic stability, increase living costs, cause societal incident, and reduce consumer trust in online transaction platforms.

For example, in e-commerce platforms, fraudulent activities may include account takeover fraud, stolen financial fraud, or high risk buying fraud. Account takeover fraud is a form of identity theft where a fraudster may leverage compromised credentials, session-hijacking, social engineering, or device takeover to utilize a victim's account to purchase items. Stolen financial fraud can also be a form of identity theft where a fraudster steals personal financial information (e.g., credit card number or bank account number) to make fraudulent charges or withdrawals from the victim's account. High risk buying fraud refers to any type of unauthorized behavior and may include account takeover fraud, stolen financial fraud, or friendly fraud. Since the consequences of fraudulent activities in online transaction platforms are devastating, developing methods and technologies to detect and identify frauds is of great importance.

SUMMARY

Some aspects of the present technology relate to, among other things, performing fraud detection on online transaction platforms through user behavior sequence data. In accordance with some configurations, a multi-task convolutional neural network (MTCNN) model is used to predict, in real-time, whether user behavior sequence data is indicative of fraudulent activity. To perform fraud detection in such configurations, a one-layer convolutional neural network architecture with multi-range kernels is employed. The MTCNN model receives a sequence of page browsing signals (e.g., signals corresponding to pages a user visited for browsing, purchasing or making a transaction, or for other purposes) corresponding to a buyer. Each page browsing signal corresponds to a position in the sequence. One or more portions of the page browsing signals are selected. Each of the one or more portions of the page browsing signals and the corresponding position are embedded in one or more sequence embeddings. A fraud risk for each of the one or more sequence embeddings is predicted utilizing the MTCNN model.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
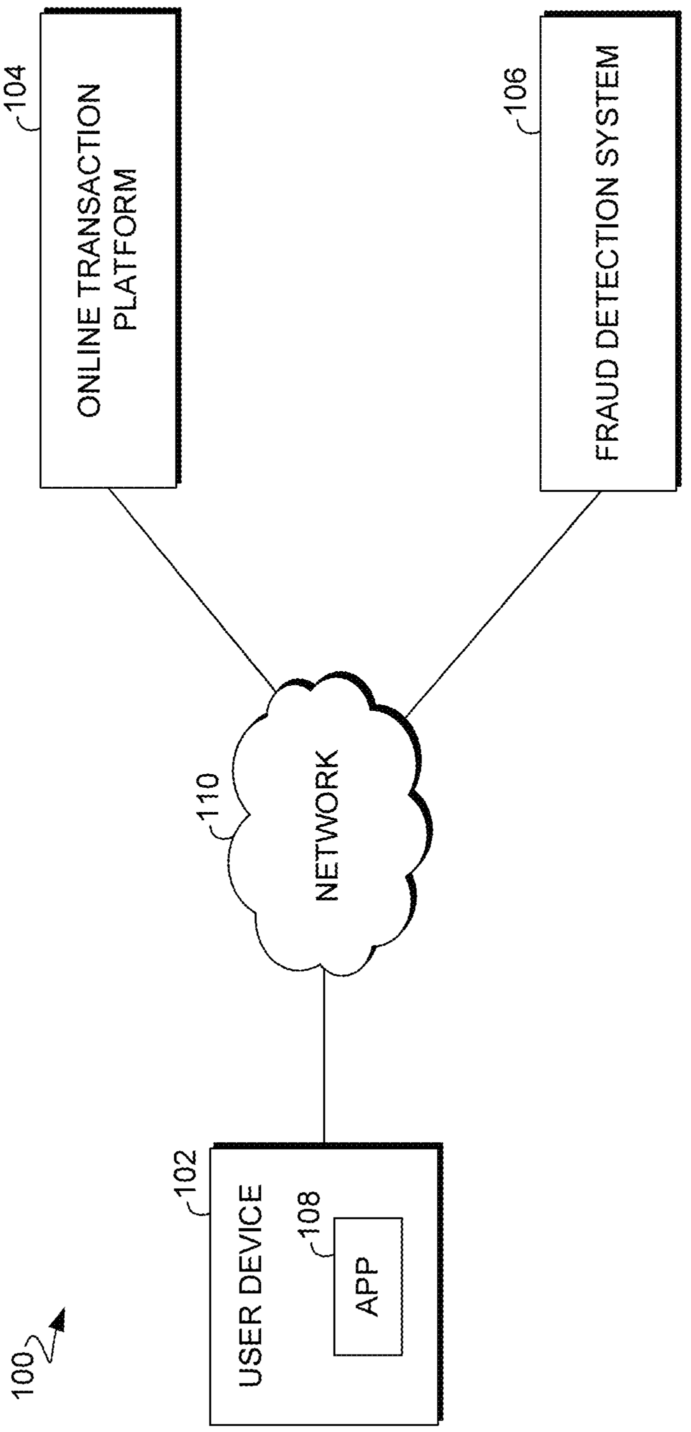
FIG. 1 is a block diagram illustrating an exemplary system, in accordance with some implementations of the present disclosure.

The continued growth of online transaction platforms (including, for instance, e-commerce and other systems that support online transactions) presents a particular challenge for identifying and combating fraudulent activity at a level that did not exist before the advent of such platforms. Conventional fraud detection approaches for online transaction platforms utilize complicated neural network architectures that struggle to balance modeling capabilities with efficiency. The resulting latency makes these approaches impractical for real-time fraud detection. Moreover, these approaches fail to leverage inductive bias to integrate domain knowledge effectively.

Aspects of the technology described herein improve the ability to detect fraudulent activity on online transaction platforms though user behavior sequence data. The techniques described herein have been demonstrated to provide marked improvement in fraud detection performance over previous approaches.

In accordance with some aspects of the technology described herein, multiple portions of user behavior sequence data are analyzed in parallel to perform fraud detection. The user behavior sequence data includes any user interaction with an online transaction platform via a user device. For example, the user behavior sequence data can be page identifiers (for pages presenting items on e-commerce platforms), item identifiers (for items presented on pages on e-commerce platforms), and/or view time (corresponding time spent on each page or item (dwell time)). The user behavior sequence data can be sourced, for instance, by logging user actions in user interfaces of online transaction platforms, such as the website of an e-commerce platform or the platform's application on user devices. During the lifecycle of a user session, the system captures a spectrum of sequential user actions.

Some aspects of the present technology train a multi-task convolutional neural network model (MTCNN) to process multiple portions of user behavior sequence data to perform fraud detection. In operation, multiple portions of user behavior sequence data from different types of user interactions (e.g., from a user session) are obtained and provided as input to the trained MTCNN model. As noted above, any of a variety of different types of user interactions can be used in combination, such as, for instance, page identifiers, item identifiers, and view time. Based on this input, the MTCNN model generates a fraud prediction output indicative of whether a particular portion of user behavior sequence data is likely to be fraudulent activity. If the fraud prediction output indicates the presence of fraud, the system can cause one or more actions to be performed for the online transaction platform, such as, for instance, blocking a transaction (i.e., preventing a transaction from being completed), freezing an account, closing an account, and/or providing a notification to an administrator of the online transaction platform.

In some configurations, the MTCNN model uses a network architecture having a one-layer convolutional neural network (CNN) architecture with multi-range kernels, where each multi-range kernel processes a different portion of user behavior sequence data. The multi-range kernels can be used to learn and identify different types of fraudulent activity utilizing the same one-layer architecture for both short- and long-term behavior patterns.

Aspects of the technology described herein provide a number of improvements over existing technologies. For instance, the synergistic effect of using a one-layer CNN model with multi-range kernels to test multiple portions of user behavior sequence data provides marked improvement in the ability to accurately and efficiently detect fraud in comparison to existing approaches. Additionally, positional encoding within the CNN framework enables the MTCNN model to recognize the sequential nature of user behavior more effectively. Moreover, by utilizing random label weights, the MTCNN model eliminates the need to manually tune label weights.

With reference now to the drawings, FIG. 1 is a block diagram illustrating an exemplary system 100 for performing fraud detection for an online transaction platform using a multi-task convolutional neural network on user behavior sequence data, in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102, an online transaction platform 104, and a fraud detection system 106. Each of the user device 102, the online transaction platform 104, and the fraud detection system 106 shown in FIG. 1 can comprise one or more computer devices, such as the computing device 500 of FIG. 5, discussed below. As shown in FIG. 1, the user device 102, the online transaction platform 104, and the fraud detection system 106 can communicate via a network 110, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present technology. Each may comprise a single device or multiple devices cooperating in a distributed environment. For instance, the online transaction platform 104 and the fraud detection system 106 could each be provided by multiple server devices collectively providing the functionality of the online transaction platform 104 and the fraud detection system 106 as described herein. Additionally, other components not shown may also be included within the network environment.

The user device 102 can be a client device on the client-side of operating environment 100, while the online transaction platform 104 and the fraud detection system 106 can be on the server-side of operating environment 100. The online transaction platform 104 and/or the fraud detection system 106 can each comprise server-side software designed to work in conjunction with client-side software on the user device 102 so as to implement any combination of the features and functionalities discussed in the present disclosure. For instance, the user device 102 can include an application 108 for interacting with the online transaction platform 104 and/or the fraud detection system 106. The application 108 can be, for instance, a web browser or a dedicated application for providing functions, such as interacting with the online transaction platform 104 and/or the fraud detection system 106. This division of operating environment 100 is provided to illustrate one example of a suitable environment, and there is no requirement for each implementation that any combination of the online transaction platform 104 and the fraud detection system 106 remain as separate entities. For instance, in some aspects, the fraud detection system 106 is a part of the online transaction platform 104. While the operating environment 100 illustrates a configuration in a networked environment with a separate user device, online transaction platform, and fraud detection system, it should be understood that other configurations can be employed in which aspects of the various components are combined.

The user device 102 may comprise any type of computing device capable of use by a user. For example, in one aspect, a user device may be the type of computing device 500 described in relation to FIG. 5 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user may be associated with the user device 102 and may interact with the online transaction platform 104 and/or the fraud detection system 106 via the user device 102.

The online transaction platform 104 can be implemented using one or more server devices, one or more platforms with corresponding application programming interfaces, cloud infrastructure, and the like. The online transaction platform 104 generally comprises any computer-based system that facilitates electronic transactions over the network 110 via user devices, such as the user device 102. In some aspects, the online transaction platform 104 comprises a listing platform (e.g., an e-commerce platform) that generally provides, to the user device 102, item listings describing items (physical or digital) available for purchase, rent, streaming, download, etc., and facilitates electronic purchase transactions for items. In other aspects, the online transaction platform 104 comprises a payment platform that facilitates electronic payment transactions between two accounts. In still further aspects, the online transaction platform 104 comprises a banking platform that facilitates the electronic transfer of money between accounts.

As described in further detail below, the fraud detection system 106 detects fraud based on user behavior sequence data from user interactions between a user device, such as the user device 102, and the online transaction platform 104. The components of the fraud detection system 106 may be in addition to other components that provide further additional functions beyond the features described herein. The fraud detection system 106 can be implemented using one or more server devices, one or more platforms with corresponding application programming interfaces, cloud infrastructure, and the like. While the fraud detection system 106 is shown separate from the online transaction platform 104 and each of the user device 102 in the configuration of FIG. 1, it should be understood that in other configurations, some of the functions of the fraud detection system 106 can be provided on the online transaction platform 104 and/or the user device.

In some aspects, the functions performed by components of the fraud detection system 106 are associated with one or more applications, services, or routines. In particular, such applications, services, or routines may operate on one or more user devices, servers, may be distributed across one or more user devices and servers, or be implemented in the cloud. Moreover, in some aspects, these components of the fraud detection system 106 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The fraud detection system 106 employs a machine learning model to predict whether user behavior sequence data is indicative of fraudulent activity on the online transaction platform 104. The user behavior sequence data generally comprises any information regarding user interaction, via the user device 102 (in some cases, using the application 108), with the online transaction platform 104.

In some configurations, the online transaction platform 104 is a website or web application that provides one or more pages (i.e., user interfaces) that are presented via the user device 102 and allow for user interaction. In such configurations, the user behavior sequence data can include any user interactions that occur with the online transaction platform 104. This data could include, for instance, page identifiers of pages viewed, item identifiers of items viewed, and view time or the length of time each page or item was viewed (i.e., dwell time).

Figure 2:
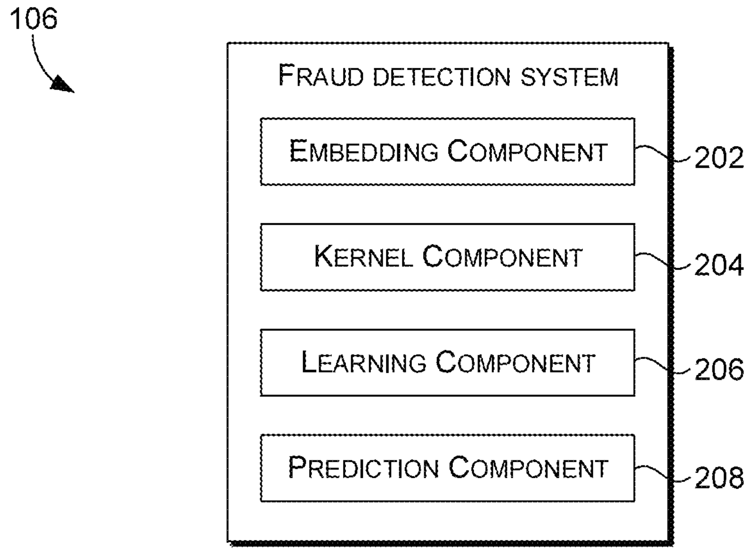
FIG. 2 is a diagram showing an example fraud detection system, in accordance with some implementations of the present disclosure.

As shown in FIG. 2, the fraud detection system 106 includes an embedding component 202, a kernel component 204, a learning component 206, and a prediction component 208. As described herein, the fraud detection system 106 uses a network architecture having a one-layer convolutional neural network (CNN) architecture with multi-range kernels, where each multi-range kernel processes a different portion of user behavior sequence data.

The embedding component 202 generally maps scalar values of numerical features to high-dimensional embedding vectors. Positional encoding (i.e., sequential information) can be expressed as:

$$PE(pos, 2i) = \sin\left(\frac{pos}{10000^{\frac{2i}{d}}}\right),$$

$$PE(pos, 2i+1) = \cos\left(\frac{pos}{10000^{\frac{2i}{d}}}\right), \text{s\_i}'' = \text{s\_i}' + PE(\text{s\_i}').$$

Customized embedding (page identifier, item identifier, view time) can be expressed as lookup embedding: $E_d(p_i)$ or $E_d(c_i)$ and scaling embedding: $t_i \times E_d(0)$, where $p_i$ refers to page identifier, $c_i$ refers to item identifier or item category, and $t_i$ refers to view time.

The kernel component 204 compresses sequence information of the embedding vectors into a number of channels based on the size of the kernel. For example, assume there are six events recorded for a particular user, each event comprising a page identifier, an item identifier, and a view time. If the kernel is represented by a 2×3 matrix, the MTCNN model trains or tests two consecutive events of the time sequence at a time. In contrast, if the kernel is represented by a 3×3 (or 4×3) matrix, the MTCNN analyzes three (or four) consecutive events of the time sequence at a time. The kernel component 204 identifies where to focus on in the event sequence for a particular type of fraudulent activity.

The training component 206 leverages historical data to train the MTCNN model. Multiple types of fraudulent activity can be trained using task specific layers and shared layers. Random weight labels eliminate the need to manually tune label weights and can be expressed by:

$$W_{task} = \frac{\exp(\xi_i)}{\sum_{Task=1}^{n} \exp(\xi_i)},$$

$\xi_i \sim \mathcal{N}(0,1)$ for each iteration. The training component 206 also uses a loss function to train the MTCNN model. The loss function can be expressed by $$L = \sum_{Task=1}^{n} W_{Task} L_{CE}^{Task}.$$

The loss function attempts to make predictions of the various types of fraudulent activity as close to the ground truth as possible (i.e., during training, the loss function attempt to predict fraudulent activity of historical training data when fraudulent activity was known to occur). Once the loss function is sufficiently minimized, the appropriate weight labels are known for each type of fraudulent activity.

To perform fraud detection on user behavior sequence data, in some configurations, the prediction component 208 uses the MTCNN model with multi-range kernels to process user behavior sequence data from user interactions with the online transaction platform 104. Any combination of different types of user behavior sequence data can be employed.

The user behavior sequence data can be from a single session or multiple sessions (e.g., from the same user device and/or using the same account).

Given user behavior sequence data as input, the MTCNN model generates a fraud prediction output that can be, for instance, a probability of fraudulent activity (e.g., on a [0,1] scale) or a binary classification of the user behavior sequence data as fraudulent or not fraudulent. When the fraud prediction output indicates the user behavior sequence data is indicative of fraudulent activity (e.g., by a probability exceeding a threshold, or a classification identifying fraud), the fraud detection system 106 can cause an action to be performed for the online transaction platform 104. This could include, for instance, freezing an account associated with the user behavior sequence data, closing an account associated with the user behavior sequence data, and/or blocking a transaction. In some instances, a notification can alternatively or additionally be provided to an administrator associated with the online transaction platform 104.

Figure 3:
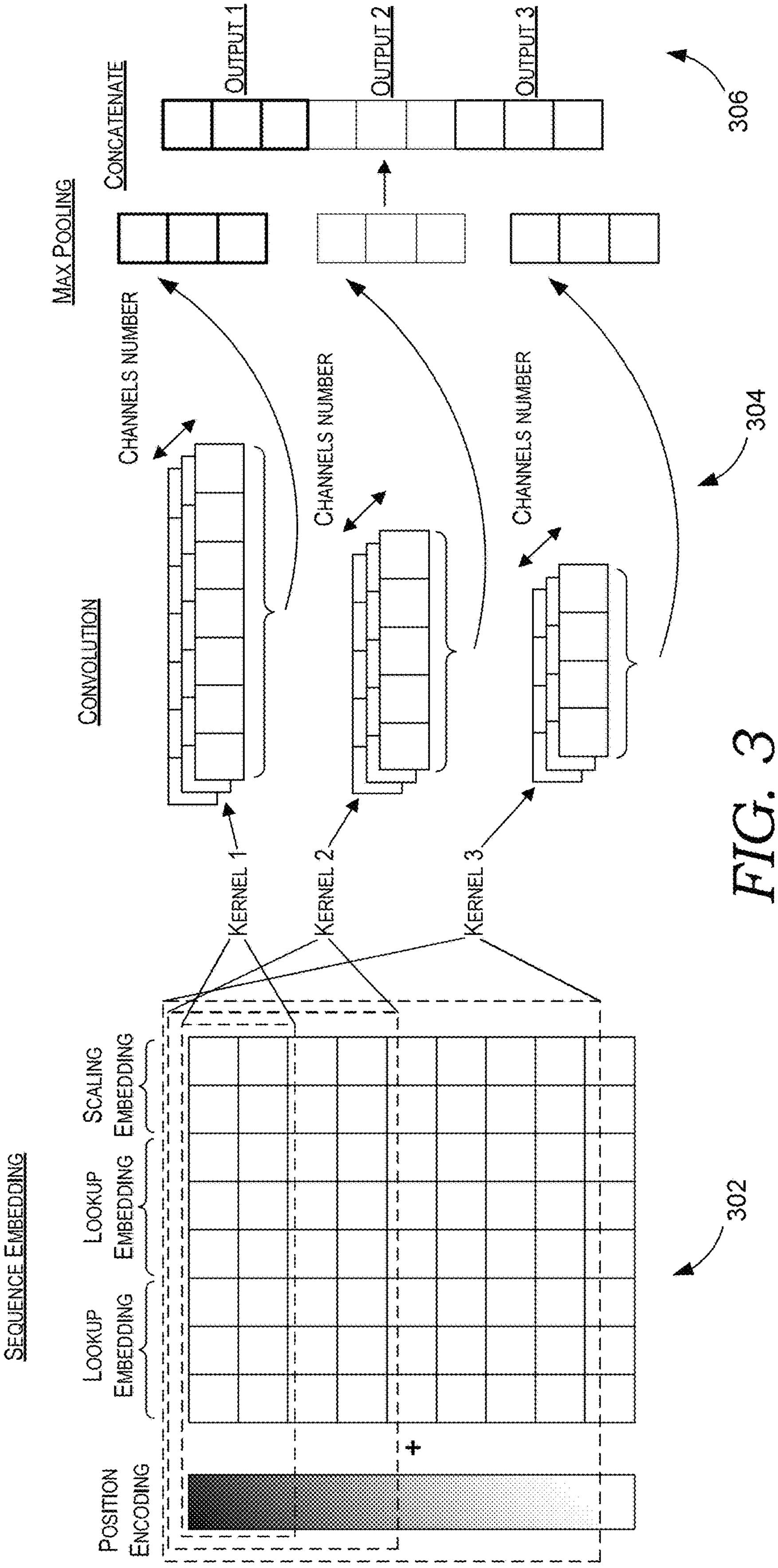
FIG. 3 is a diagram of an example network architecture for a multi-task convolutional neural network model, in accordance with some implementations of the present disclosure.

FIG. 3 provides an example of a network architecture 300 for a MTCNN model, in accordance with some aspects of the technology described herein. As shown, the inputs 302 to the MTCNN model comprise sequence embedding data that includes positional embedding (sequential information), lookup embedding (page identifier, item identifier), and scaling embedding (view time). The particular types of input data shown in FIG. 3 are provided by way of example only, and other types of inputs can be employed.

During convolution 304, multi-range kernels yield multiple channels of short- and long-term snapshots of embedded user behavior sequence data. For each multi-range kernel, max pooling can be performed for each of the resulting channels to further compress the data and force the MTCNN model to learn the most representative signal. After max pooling, the encoded representations are merged into a combined representation (e.g., a high-dimensional feature vector) through a concatenate operation. While a concatenate operation is shown as an example in FIG. 3, any type of operation that combines or fuses feature vectors, such as weighted summation or attention mechanism, can be employed.

After concatenation, multi-task outputs 306 are provided by the MTCNN. The multi-task outputs 306 indicate whether a particular type of transaction fraud is present within the real-time data in a current transaction. For example, the multi-task outputs 306 may predict whether the current transaction is likely to be account takeover fraud, stolen financial fraud, or high risk buying.

Figure 4:
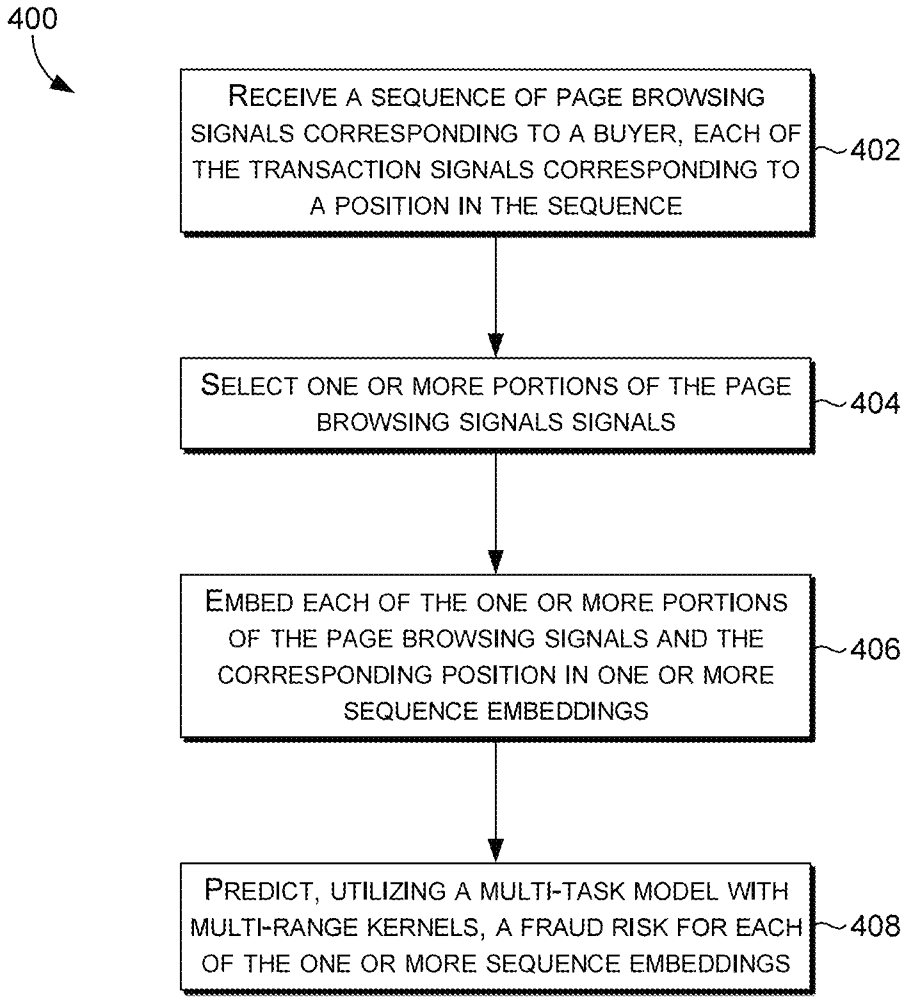
FIG. 4 is a flow diagram showing a method for performing fraud detection for an online transaction platform using a multi-task convolutional neural network on user behavior sequence data, in accordance with some implementations of the present disclosure.

With reference now to FIG. 4, a flow diagram is provided that illustrates a method 400 for performing fraud detection for an online transaction platform using a multi-task convolutional neural network on user behavior sequence data. The method 400 can be performed, for instance, by the fraud detection system 106 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a sequence of page browsing signals corresponding to a buyer is received. Each of the page browsing signals corresponds to a position in the sequence. The page browsing signals may comprise page identification, item identification, and/or view time. In some aspects, a purchase signal corresponding to the buyer is received indicating the buyer has attempted to purchase an item. Upon identifying the purchase signal, the sequence of page browsing signals may be requested. As shown at block 404, one or more portions of the page browsing signals are selected.

As shown at block 406, each of the one or more portions of the page browsing signals and the corresponding position are embedded in one or more sequence embeddings. In some aspects, based on the fraud risk for at least one of the one or more sequence embedding indicating the buyer is attempting transaction fraud, a completion of the transaction is prevented in real-time. For example, the account can be frozen, the account can be closed, the transaction can be blocked, and/or a notification can be provided to a device of an administrator of the online transaction platform.

As shown at block 408, a fraud risk is predicted for each of the one or more sequence embeddings, utilizing a multi-task model with multi-range kernels. The multi-task model may be a one-layer convolutional neural network architecture. Additionally, the multi-task model may be trained with random label weights. The multi-task model may be trained to identify each of the one or more types of fraud risk in parallel. In some aspects, the multi-task model is a convolutional neural network trained to detect one or more types of fraud risk in parallel utilizing the multi-range kernels. In various aspects, the type of fraud risk predicted by the multi-task model may comprise account takeover fraud, stolen financial fraud, or high risk buying.

Figure 5:
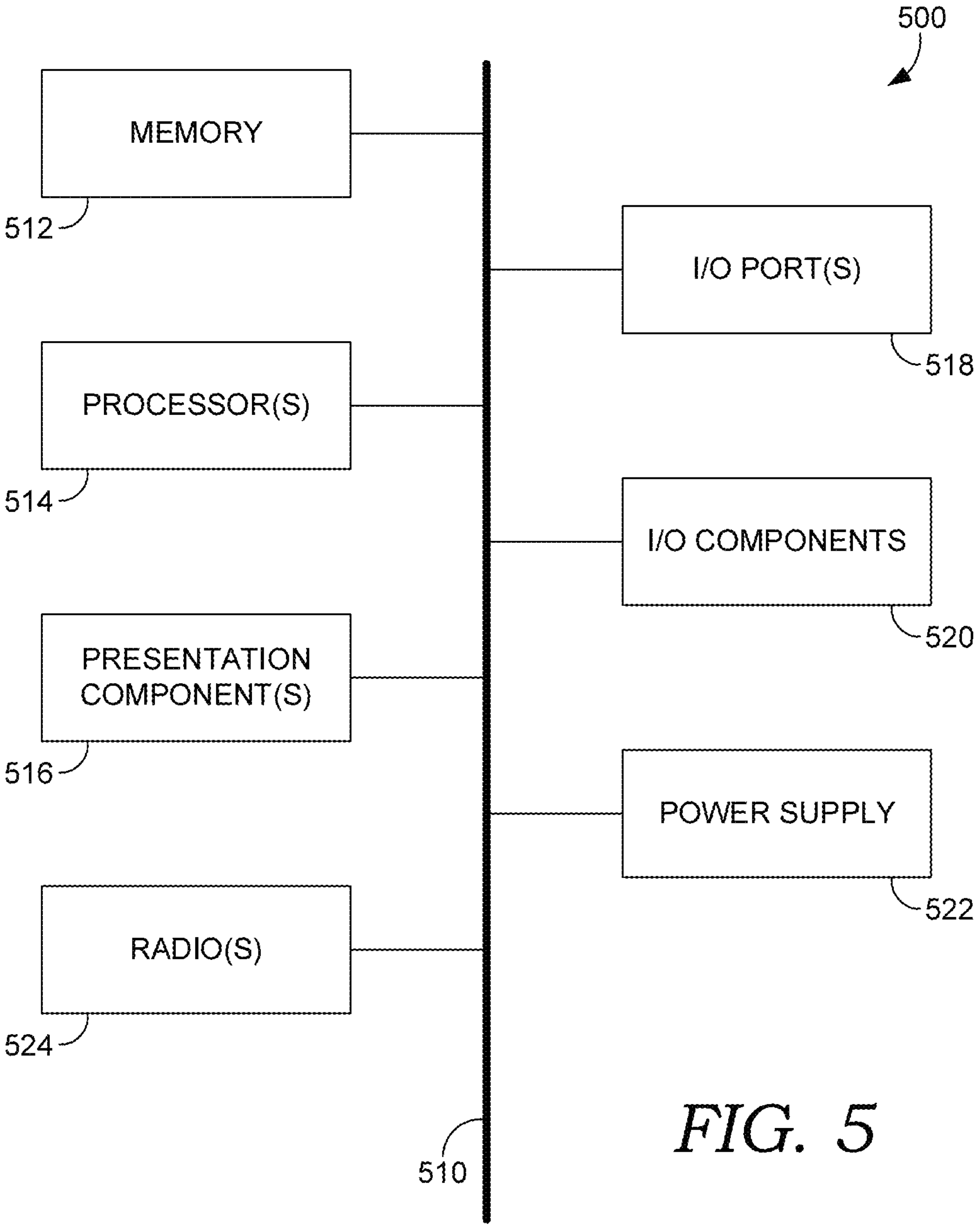
FIG. 5 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 5 in particular, an exemplary operating environment for implementing embodiments of the present technology is shown and designated generally as computing device 500. Computing device 500 is but one example of a suitable computing environment and is not intended to suggest any limitation as to the scope of use or functionality of the technology. Neither should the computing device 500 be interpreted as having any dependency or requirement relating to any one or combination of components illustrated.

The technology can be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what can be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. The terms "computer storage media" and "computer storage medium" do not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory can be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which can be built in. Illustrative components include a microphone, joystick, game pad, satellite dish, scanner, printer, wireless device, etc. The I/O components 520 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 can be equipped with depth cameras, such as, stereoscopic camera systems, infrared camera systems, RGB camera systems, and combinations of these for gesture detection and recognition. Additionally, the computing device 500 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-usable instructions that, when used by one or more computing devices, cause the one or more computing devices to perform operations, the operations comprising:

accessing, by at least one server from one or more servers of an online transaction platform, a sequence of page browsing signals corresponding to user interactions of a user with the online transaction platform, each of the page browsing signals corresponding to a position in the sequence;

selecting, by at least one server from the one or more servers, a plurality of temporally distinct portions of the sequence of page browsing signals, the plurality of temporally distinct portions comprising at least a first portion spanning a first temporal window of user interactions and a second portion spanning a second, longer temporal window of user interactions that overlaps the first temporal window;

generating, by at least one server from the one or more servers, a plurality of sequence embeddings, wherein each sequence embedding is generated for a corresponding temporally distinct portion from the plurality of temporally distinct portions using the page browsing signals in the corresponding temporally distinct portion and positional information indicative of an order of the page browsing signals in the corresponding temporally distinct portion;

predicting, by at least one server from the one or more servers utilizing a multi-task model with multi-range kernels trained to detect fraudulent activity in online transactions, a fraud risk for each of the plurality of sequence embeddings in parallel, wherein each multi-range kernel convolves over a different temporal span corresponding to a different one of the plurality of temporally distinct portions; and causing, by at least one server from the one or more servers, an action to be performed on the online transaction platform based on the fraud risk for at least one of the plurality of sequence embeddings, the action comprising at least one of blocking a transaction involving the user, freezing an account of the user, or closing the account of the user.

2. The one or more computer storage media of claim 1, further comprising identifying a purchase signal corresponding to the user, the purchase signal indicating the user has attempted to purchase an item.

3. The one or more computer storage media of claim 2, further comprising, upon identifying the purchase signal, requesting the sequence of page browsing signals.

4. The one or more computer storage media of claim 1, wherein the fraud risk for each of the plurality of sequence embeddings indicates the user is attempting transaction fraud for a current transaction, and the action comprises blocking the current transaction in real-time.

5. The one or more computer storage media of claim 1, wherein the multi-task model is a convolutional neural network trained to detect one or more types of fraud risk in parallel utilizing the multi-range kernels.

6. The one or more computer storage media of claim 1, wherein the page browsing signals comprise page identification, item identification, and view time.

7. The one or more computer storage media of claim 1, wherein the multi-task model is a one-layer convolutional neural network architecture.

8. The one or more computer storage media of claim 1, wherein the multi-task model is trained with random label weights.

9. The one or more computer storage media of claim 1, wherein the multi-task model is trained for each of one or more types of transaction fraud in parallel.

10. The one or more computer storage media of claim 1, wherein the fraud risk for each of the plurality of sequence embeddings is indicative of an account takeover, stolen financial information, or high risk buying.

11. A computer-implemented method comprising:

accessing, by at least one server from one or more servers of an online transaction platform, a sequence of page browsing signals corresponding to user interactions of a user with the online transaction platform, each of the page browsing signals corresponding to a position in the sequence;

selecting, by at least one server from the one or more servers, a plurality of temporally distinct portions of the sequence of page browsing signals, the plurality of temporally distinct portions comprising at least a first portion spanning a first temporal window of user interactions and a second portion spanning a second, longer temporal window of user interactions that overlaps the first temporal window;

generating, by at least one server from the one or more servers, a plurality of sequence embeddings, wherein each sequence embedding is generated for a corresponding temporally distinct portion from the plurality of temporally distinct portions using the page browsing signals in the corresponding temporally distinct portion and positional information indicative of an order of the page browsing signals in the corresponding temporally distinct portion;

predicting, by at least one server from the one or more servers utilizing a multi-task model with multi-range kernels trained to detect fraudulent activity in online transactions, a fraud risk for each of the plurality of sequence embeddings in parallel, wherein each multi-range kernel convolves over a different temporal span corresponding to a different one of the plurality of temporally distinct portions; and causing, by at least one server from the one or more servers, an action to be performed on the online transaction platform based on the fraud risk for at least one of the plurality of sequence embeddings, the action comprising at least one of blocking a transaction involving the user, freezing an account of the user, or closing the account of the user.

12. The computer-implemented method of claim 11, further comprising identifying a purchase signal corresponding to the user, the purchase signal indicating the user has attempted to purchase an item.

13. The computer-implemented method of claim 12, further comprising, upon identifying the purchase signal, requesting the sequence of page browsing signals.

14. The computer-implemented method of claim 11, wherein the fraud risk for each of the plurality of sequence embeddings indicates the user is attempting transaction fraud for a current transaction, and the action comprises blocking the current transaction in real-time.

15. The computer-implemented method of claim 11, wherein the multi-task model is a convolutional neural network trained to detect one or more types of transaction fraud in parallel utilizing the multi-range kernels.

16. A computer system comprising:

one or more processors; and one or more computer storage medium storing computer-usable instructions that, when used by the one or more processors, causes the computer system to perform operations comprising:

accessing, by at least one server from one or more servers of an online transaction platform, a sequence of page browsing signals corresponding to user interactions of a user with the online transaction platform, each of the page browsing signals corresponding to a position in the sequence;

selecting, by at least one server from the one or more servers, a plurality of temporally distinct portions of the sequence of page browsing signals, the plurality of temporally distinct portions comprising at least a first portion spanning a first temporal window of user interactions and a second portion spanning a second, longer temporal window of user interactions that overlaps the first temporal window;

generating, by at least one server from the one or more servers, a plurality of sequence embeddings, wherein each sequence embedding is generated for a corresponding temporally distinct portion from the plurality of temporally distinct portions using the page browsing signals in the corresponding temporally distinct portion and positional information indicative of an order of the page browsing signals in the corresponding temporally distinct portion;

predicting, by at least one server from the one or more servers utilizing a multi-task model with multi-range kernels trained to detect fraudulent activity in online transactions, a fraud risk for each of the plurality of sequence embeddings in parallel, wherein each multi-range kernel convolves over a different temporal span corresponding to a different one of the plurality of temporally distinct portions; and causing, by at least one server from the one or more servers, an action to be performed on the online transaction platform based on the fraud risk for at least one of the plurality of sequence embeddings, the action comprising at least one of blocking a transaction involving the user, freezing an account of the user, or closing the account of the user.

17. The computer system of claim 16, further comprising identifying a purchase signal corresponding to the user, the purchase signal indicating the user has attempted to purchase an item.

18. The computer system of claim 17, further comprising, upon identifying the purchase signal, requesting the sequence of page browsing signals.

19. The computer system of claim 16, wherein the fraud risk for each of the plurality of sequence embeddings indicates the user is attempting transaction fraud for a current transaction, and the action comprises blocking the current transaction in real-time.

20. The computer system of claim 16, wherein the multi-task model is a convolutional neural network trained to detect one or more types of transaction fraud in parallel utilizing the multi-range kernels.

* * * * *